Oct. 24, 1967          E. F. GORMAN          3,349,213
MULTI-ARC SEAM WELDING DEVICES
Filed Aug. 19, 1966          2 Sheets-Sheet 1
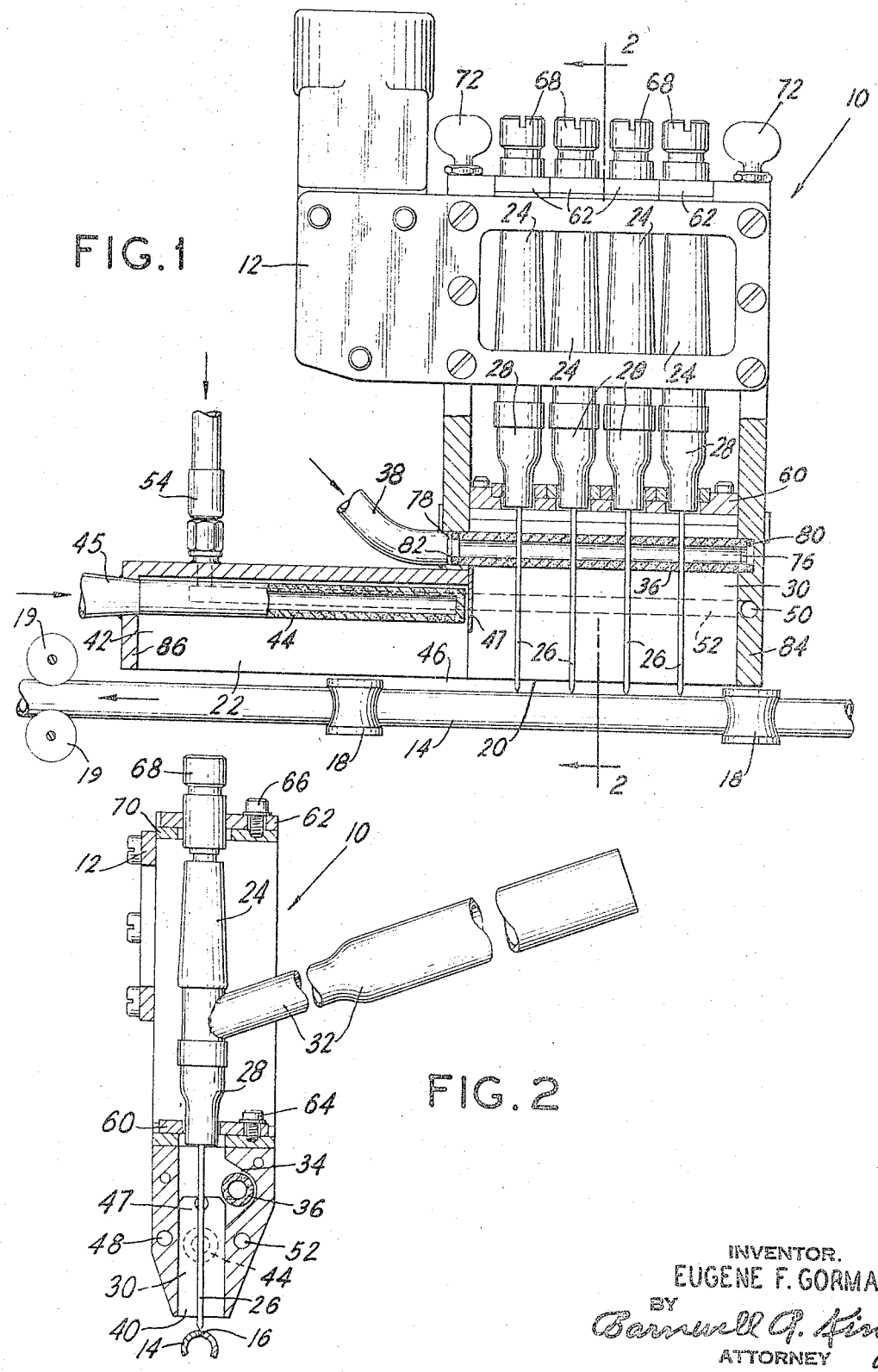
INVENTOR.
EUGENE F. GORMAN
BY
Barnwell G. King
ATTORNEY Oct. 24, 1967  E. F. GORMAN  3,349,213
MULTI-ARC SEAM WELDING DEVICES
Filed Aug. 19, 1966  2 Sheets-Sheet 2

INVENTOR.
EUGENE F. GORMAN
BY
Barnwell P. King
ATTORNEY

United States Patent Office 3,349,213
Patented Oct. 24, 1967

3,349,213
MULTI-ARC SEAM WELDING DEVICES
Eugene F. Gorman, Morris Plains, N.J., assignor to Union Carbide Corporation, a corporation of New York
Filed Aug. 19, 1966, Ser. No. 573,595
9 Claims. (Cl. 219—60)

ABSTRACT OF THE DISCLOSURE

A multi-arc seam welding torch having a plurality of arc electrodes projecting from individual electrode holders through a bottom slotted common elongated gas chamber containing a tubular inert gas lens mounted lengthwise in the chamber between the electrode holders and the bottom slot such that the multi-arcs developed between the electrodes and the work to be seam welded are shielded from the air.

---

Figure 3:
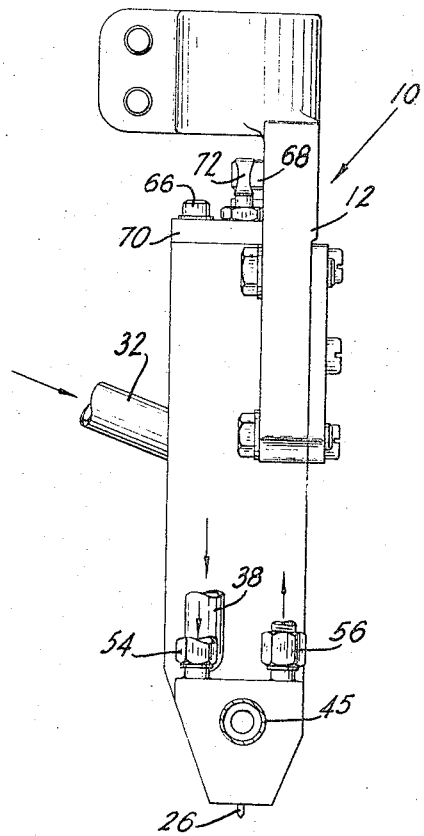

This invention relates to gas shielded fusion fabricating apparatus and more particularly to work-in-circuit multi-arc seam welding devices.

The invention provides a device for work-in-circuit seam welding stainless steel tubing, for example, at a relatively rapid rate, which includes a multi-electrode gas-shielding welding section and a weld trailing gas-shielding section. Each section comprises means having an elongated chamber for shielding gas which communicates directly with an elongated gas outlet facing the seam being welded. Each chamber contains a novel tubular gas lens composed of porous material to which shielding gas is continuously supplied to keep each chamber filled with non-turbulent gas for uniform discharge from each outlet. From such outlets the gas flows toward and over the work as the latter is moved in the direction of the seam as the latter is arc welded, as well as directly thereafter, efficiently and effectively protecting the operation and the weld from atmospheric contamination.

The invention is effective to shield the critical area of the seam while and directly after being welded, so that oxide spots are not formed, which results in superior as well as cleaner welds, even at relatively high welding speeds. This overcomes the cause of failure in the case of prior art multi-arc welding.

An important feature of the invention is the provision of means for lining up the electrodes exactly parallel to the center of the seam. This overcomes the prior art difficulty of undesirable undercutting along the sides of the finished weld. Another feature is the provision of means for independently adjusting each electrode to set its arc length before as well as during welding. This overcomes the prior art difficulty due to non-uniform cathode tip erosion during long welding runs, for example.

Figure 4:
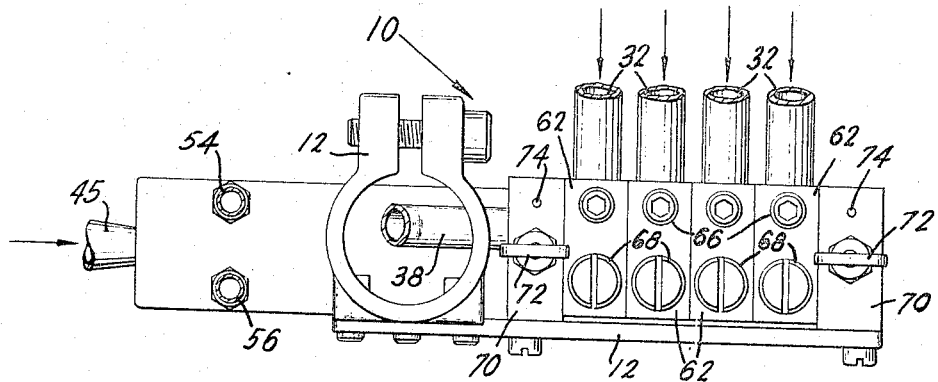

In the drawings:

FIGURE 1 is a side elevational view, partly in vertical-longitudinal section of a device illustrating the invention;
FIGURE 2 is a fragmentary view partly in cross-section of such device taken on line 2—2 of FIGURE 1;
FIGURE 3 is a rear end view of such device; and
FIGURE 4 is a fragmentary top plan view of the device.

The device 10 is mounted by a bracket 12 in operative position above a tube 14 provided with an upper longitudinal seam 16 to be welded. The tube is carried by pairs of seam closure or squeeze rolls 18 and support rolls 19, in the direction indicated, under the device 10 at a relatively rapid rate, first past a welding section 20, and then past a gas-shielding section 22 of the device 10. The section 20 includes a plurality of electrode holders 24 comprising non-consumable electrodes 26 which depend from individual insulators 28 through the center of an elongated, substantially rectangular gas chamber 30 located adjacent the bottom of the section 20 in the device 10.

Purging gas is delivered (at least prior to starting the operation) to each of the holders 28 through an individual conduit 32, which also contains water cooling conduits as well as electrical conductors for carrying arc welding current to each electrode 26. Such currents are sufficient to support welding arcs at the electrode tips adjacent the seam 16 of the tube 14 with the latter in circuit therewith. In the case of direct current, for example, the tube is positive and the electrodes negative. Located adjacent a recess 34 in one side of the chamber 30 is a tubular gas lens 36 which is supplied with inert gas, argon for example, through a conduit 38. The tubular gas lens 36 is composed of porous metal, or ceramic, and lets such gas into the chamber 30 gently but fully, so that such gas exists from outlet 40 at the bottom of the welding section 20 of the device 10, efficiently and effectively protecting the electrodes 26, and the arcs, as well as the seam 16 being arc welded as the tube 14 moves thereunder.

The trailing section 22 of the device is also provided with an elongated chamber 42 in which is mounted a tubular gas lens 44 that is supplied with inert gas, argon or nitrogen for example, through conduit 45. The gas lens 44 is also composed of porous metal, or ceramic, and gently fills the chamber 42 with such gas, so that the latter exits from outlet 46 at the bottom of section 22 over the previously welded seam 16 as the latter moves under such outlet, also efficiently and effectively shielding the welt from contamination by the ambient atmosphere, while the weld is still in a vulnerable condition, allowing the metal to cool and harden without adverse discoloration or oxidation. Partition 47 located between the chambers permits the use of nitrogen gas in section 22 when argon is used in section 20.

The device is water-cooled in the walls of both sections by flowing cooling water through passages 48, 50 and 52 therein, such water being supplied through conduit 54 and discharged via conduit 56.

The invention welds stainless steel tubing, for example, at exceptionally high welding speeds, at least twice as fast as in the prior art. The welds are of top quality and of the same shape and size as conventional welds. The process is simple and reliable. The invention herein described is highly suitable for welding stainless tubing of $\frac{1}{32}$ in. to $\frac{1}{8}$ in. wall thicknesses on continuous strip-fed mills. Welding speeds using argon shielding gas in the welding section are shown in the following table. The welding speed on $\frac{1}{16}$ in. stainless steel tubing was confirmed on a commercial tube mill when several thousand feet of high quality welds were produced.

MULTICATHODE WELDING SPEEDS

| Thickness (inch) | Speed (i.p.m.) | Average Current (amp. DCSP/electrode) |
|---|---|---|
| $\frac{1}{32}$ | 190 | 140 |
| $\frac{1}{16}$ | 96 | 165 |
| $\frac{3}{32}$ | 70 | 185 |
| $\frac{1}{8}$ | 45 | 200 |

Somewhat higher speeds have been obtained with argon-hydrogen mixtures and with helium. The invention is also suitable for fully killed carbon steel.

The last electrode should be placed approximately two inches upstream of the weld roll squeeze point. A tight butt joint is required, which in most cases, will necessitate the use of two pairs of welding rolls with the first pair closing the tube joint and the second applying the weld squeeze force. The tandem electrodes *must* be accurately aligned with the axis of the joint. Seam wandering from side to side *cannot* be tolerated because, at high speeds, it is impractical for an operator to do more than a minimal amount of seam tracking. Joint edge mismatch should be less than 10 percent of the tube wall thickness. Also, the mill's drive system and forming stands should have adequate strength to assure uniform feeding of the tubing at the increased speeds. Speed variations should be less than five percent.

The electrodes 26, which are composed of tungsten sticks, are suitably mounted in the main torch body to obtain accurate alignment and adjustment of the individual arc lengths. Shielding gas is supplied through each gas lens to shield the multiple arcs and the weld puddle. Since the weld puddle is quite elongated at the high welding speeds the trailing gas shield protects the weld metal from atmospheric contamination.

The holders 24 are mounted in tandem fashion on ⅝ in. spacings. Low-volume gas purge and water cooling are provided to each electrode holder. Precise control of the transverse electrode alignment is made with small transverse slides 60 and 62 that are locked in place with cap screws 64 and 66. Fine trim of each arc length is controlled by and adjustment screw 68 on the top of each holder. Each screw 68 is electrically insulated so that electrode height or arc length adjustment is made safely during the welding operation.

Replacement or repair of the electrodes is accomplished quickly by removing a yoke 70 after the two thumb screws 72 are loosened. Each electrode 26 is inserted through the bottom end of its electrode holder 24 and locked at the exact desired extension by tightening a collet therein. Repositioning of the yoke 70 is precise as the yoke fits over tooling pin pilots 74. The ceramic cups 28 at the bottom of each electrode holder insulate them from the main torch body and guide the vertical adjustments. The electrodes are carefully adjusted so that their longitudinal axes are in a plane which passes through the longitudinal center of the seam to be welded.

The main torch body is water cooled. It contains the tubular gas lens 36 for continuous shielding of all welding arcs and the weld puddle. The gas lens 36 is held in place in recessed holes 76 and 78 in the partitions at each end of the main torch body. The gas lens is sealed with gas tight high temperature "O" rings 80 and 82. Access to the gas lens 36 is obtained by unscrewing the partition 84 from the torch front.

The trailing gas shield section is also water cooled. It has the separate gas lens 44 connection to the conduit 45 through end wall 86 of the trailing gas shield section. The small partition 47 is placed between the trailing gas shield section chamber and the main torch body section chamber to keep the gas shielding atmospheres separate. Thus, one gas such as argon can be used in the welding zone and other gas such as nitrogen in the trailing zone.

The torch clamp 12 is bolted to a steel plate on the side of the main torch body. The entire torch may be attached to a vertical rack and tube assembly, not shown, with the torch clamp. The torch adjustment assembly gives manual adjustment of both the vertical height and lateral position of the torch relative to the weld joint.

The preferred procedure for obtaining good welding results is to operate with constant arc length and current at each electrode. Usually, a 1/16 in. arc gap is preferred. The DCSP amperage at each electrode is set at the value suitable for welding at normal speeds. However, the multicathode speed is much greater than that of the normal process.

Further speed gains with the multicathode invention have been obtained by increasing the current on the lead electrode to a value well above that on the remaining electrodes. Individual arc lengths are adjusted to conform to the puddle surface level. This technique is worked out for each application, but is not recommended for general usage.

Standard ⅛ in. dia. 2% thoriated tungsten stick electrodes are preferred although smaller sizes can be used. The tips are pointed for at least ¼ in. and the sharp ends blunted to about 1/32 in. dia. At currents above 150 amps., the lead electrode is blunted to about 1/16 in. dia. and used with very short arc gap. During continuous welding operation, the middle electrodes erode faster than the end electrodes. The necessary torch adjustments are made by the operator to correct arc length while continuing to weld. Continuous operation for four hours and more is possible before tip redressing is required.

Shielding requirements for multicathode welding are more stringent than for single arcs. The shielding zone is large and the maximum quality of shielding is critical. Air infiltration, besides contaminating the weld and electrodes, causes gross arc instability by forming slag spots floating on the puddle surface. Such spots interfere with anode behavior resulting in what appears to be split arcs. Heat input into the welds is thus distributed in an irregular and uncontrollable way. This trouble is avoided according to the invention, which provides adequate shielding over the entire weld zone, as well as immediately thereafter.

Proper shielding is provided by argon flow rates of 100 c.f.h. through the main torch body chamber and 5 c.f.h. purge through each of the electrode holders. A flow rate of 100 c.f.h. of either argon of nitrogen is preferred through the trailing gas shield outlet. These flow values are based on operation with electrodes extending ⅜ in. beyond the main torch body. Shorter extensions permit reduction in gas flow rates. Conversely, longer extensions require higher flow rates.

What is claimed is:

1. A multi-arc seam welding apparatus comprising a plurality of gas shielded arc electrode holders having electrodes extending therefrom and arranged in a file corresponding to the seam, a housing having a common chamber provided with a common slot through which said electrodes project, and a tubular gas lens mounted lengthwise in such chamber, external to said electrodes, and positioned between said electrode holders and the common slot of the chamber for continuously filling such chamber with shielding gas for uniform exit from such slot around the tips of said electrodes and over such seam.

2. Apparatus as defined by claim 1, in which said tubular gas lens is composed of porous material.

3. Apparatus as defined by claim 1, in which the chamber means includes a welding section and a trailing section, said trailing section having a slot which is in line with the slot of said welding section to discharge shielding gas so that such gas flows over the seam as the latter is being welded as well as over the weld directly thereafter.

4. Apparatus as defined by claim 1, wherein said tubular gas shielding lens is mounted in such chamber to one side of said electrodes.

5. Apparatus as defined by claim 1, in which each of said holders is provided with a non-consumable stick electrode which projects through such slot toward such seam, and means for energizing arcs between each electrode and metal work constituting the seam.

6. Apparatus as defined by claim 1, in which the walls of such chamber and slot are contiguous, and said gas lens is located longitudinally therein in a parallel relationship with the seam being welded.

7. Apparatus as defined by claim 1, including means for adjusting each electrode longitudinally of itself to set the arc length thereof.

8. Apparatus as defined by claim 1, including means for adjusting the electrodes transversely with respect to each other and the seam so that their longitudinal axes are in a plane which passes through the longitudinal center of such seam.

9. Apparatus as defined by claim 3, in which the trailing section has a separate tubular gas lens mounted therein and a partition for separating the trailing section from the chamber of the welding section to keep the gas shielding atmospheres separate.

References Cited
UNITED STATES PATENTS

| | | | |
|---|---|---|---|
| 2,061,671 | 11/1936 | Riemenschneider | 219—124 |
| 2,106,692 | 1/1938 | Embleton | 219—75 |
| 3,068,343 | 12/1962 | Rossner | 219—60 |
| 3,087,045 | 4/1963 | Correy et al. | 219—74 |
| 3,125,666 | 3/1964 | Gorman et al. | 219—74 |
| 3,261,962 | 7/1966 | Carkhuff et al. | 219—130 |

RICHARD M. WOOD, *Primary Examiner.*